Sept. 8, 1925.
C. B. WRIGHT
ACCELERATOR CONTROL DEVICE
Filed March 11, 1924
1,553,280
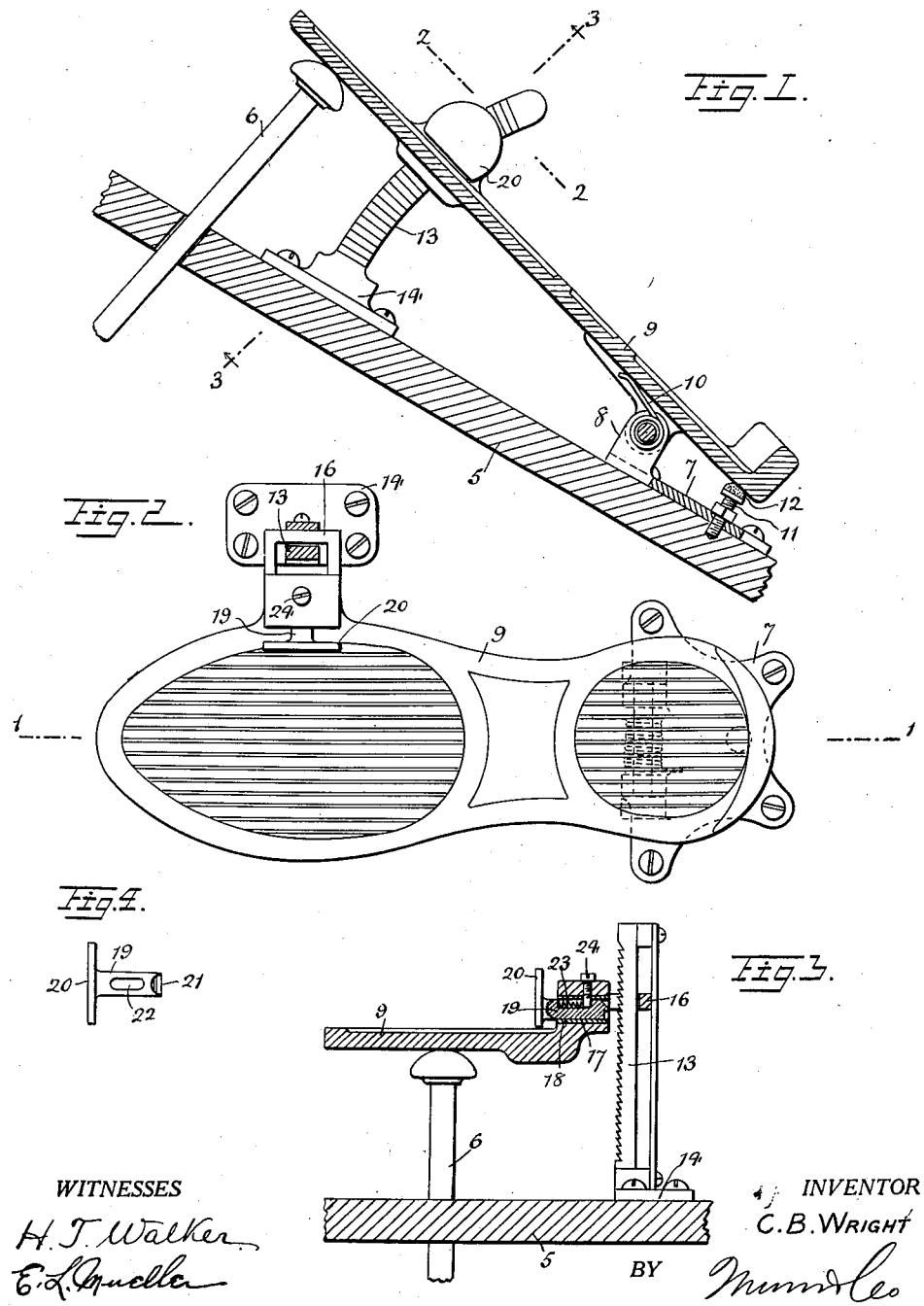
WITNESSES
H. T. Walker
E. L. Mueller
INVENTOR
C. B. Wright
BY
ATTORNEYS Patented Sept. 8, 1925.

1,553,280

UNITED STATES PATENT OFFICE.

CHARLES B. WRIGHT, OF JERSEY CITY, NEW JERSEY, ASSIGNOR TO ACCELRITE MANUFACTURING CO., OF HARRISON, NEW JERSEY, A CORPORATION OF NEW JERSEY.

ACCELERATOR-CONTROL DEVICE.

Application filed March 11, 1924. Serial No. 698,475.

*To all whom it may concern:*

Be it known that I, CHARLES B. WRIGHT, a citizen of the United States, and a resident of Jersey City, in the county of Hudson and State of New Jersey, have invented a new and Improved Accelerator-Control Device, of which the following is a full, clear, and exact description.

This invention relates to improvements in control mechanisms for motor vehicles, and has particular reference to an accelerator control device.

An object of the invention is to provide a simple and practical device which may be applied to various standard types of motor vehicles and in which improved means are provided for releasably maintaining the accelerator in various adjusted positions so as to prevent the same from being vibrated by the foot of the operators when a vehicle is passing over uneven surfaces.

The above and other objects will appear more clearly from the following detailed description, when taken in connection with the accompanying drawing, which illustrates a preferred embodiment of the inventive idea.

In the drawing—

Figure 1 is a longitudinal sectional view of the device taken substantially on the line 1—1 of Figure 2;

Figure 2 is a top plan view with a section taken on the line 2—2 of Figure 1;

Figure 3 is a section substantially on the line 3—3 of Figure 1; and

Figure 4 is a detail plan view of the latching member employed in connection with the invention.

Referring more particularly to the drawing the numeral 5 designates the usual floor board of a motor vehicle through which extends the foot-controlled accelerator. It is well known that considerable difficulty is experienced when traveling over uneven surfaces in preventing the vibratory movement of the accelerator 6 with a consequent unevenness in the running of the engine.

With the end in view of overcoming the above difficulty the invention provides a device which consists of a base plate 7 secured in any preferred manner to the floor board 5 at a suitable distance from the accelerator 6 and having the lugs 8 at one end thereof. Pivoted to the lugs 8 is the heel portion of a foot pedal 9 which may be cast or otherwise formed and the under surface of which is engaged by one end of a spring 10 coiled about the pivot of the foot pedal so as to normally maintain the forward end of the pedal elevated and prevent undue pressure of said end upon the accelerator 6. The elevation of the forward end of the foot pedal is limited by means of a stop 11 in the form of a screw adjustably mounted in the base plate 7 and carrying a bumper 12 of rubber or any other suitable material upon its head which is engaged by the heel portion of the foot pedal, as shown in Figure 1.

Associated with the foot pedal 9 is an arcuate rack 13 having a base 14 which is secured to the floor board 5 at a point adjacent the accelerator 6. The rack portion of the member 13 is arranged so as to extend adjacent one edge of the foot pedal at a point intermediate the sole portion thereof. At this point said edge of the foot portion of the pedal is provided with an upwardly extending enlargement 15 from which projects laterally a guide 16 through which the rack 13 extends. The enlargement 15 is formed with an opening 17 therethrough in which is mounted a bushing 18 which receives a sliding latch 19. The latch 19 is slidable in the enlargement 15 in a direction transverse to the foot pedal and is provided at its inner end with an enlarged head 20 designed to be engaged by the foot of the operator to move said latch to its operative position. At the opposite end of the latch the same is provided with a projection 21 in the form of a tooth engageable with the teeth of the rack 13 when the rack is in its operative position. To maintain the latch in its normal or inoperative position, as shown in Figure 3, the latch is provided with an elongated recess 22 extending longitudinally of the body portion of the latch and having mounted therein a small coil spring 23, one end of which engages an end of the recess 22 while the other end abuts against a screw 24 extended through the enlargement 15 and bushing 18 and projecting into the recess 22, said screw thereby forming a stationary abutment and also acting as a guide to prevent rotary movement of the latch in the bushing.

From the foregoing description it will be apparent that if it is desired to rigidly maintain the accelerator 6 in a depressed position the operator may force the latch member outwardly by engagement with the head 20 thereof until the projection 21 engages the rack 13, whereupon the foot pedal will be locked against any further downward movement and the pressure of the operator's foot upon said pedal will keep the same from moving toward its normal position under the influence of the spring 10.

What is claimed is:

1. In an accelerator control device, a separate pivotally mounted foot pedal engageable adjacent one end with the accelerator, a locking member with respect to which said foot pedal is movable, latching means carried by the foot pedal and movable laterally with respect thereto into engagement with said locking member to prevent movement of said foot pedal in the accelerating direction, and yieldable means for holding said latching means normally out of engagement with said locking member.

2. In an accelerator control device, a separate pivotally mounted foot pedal engageable adjacent one end with the accelerator, a locking member with respect to which said foot pedal is movable, a latch carried by the foot pedal and movable laterally with respect thereto by pressure exerted on the latch by the foot of an operator to engage the latch with said locking member to retain the foot pedal against movement in the accelerating direction, and means for restoring said latch to its normal position upon said pressure being relieved.

3. In an accelerator control device, a separate pivotally mounted foot pedal engageable adjacent one end with the accelerator and capable of being depressed by a movement thereof about its pivot in one direction to actuate said accelerator, a rack bar fixed with respect to said foot pedal, a spring-pressed latch carried by the foot pedal and movable laterally with respect thereto from a normal position into engagement with said rack bar to prevent movement of said foot pedal in the accelerating direction, and means engageable with said latch to prevent any other movement thereof than said lateral movement.

4. In an accelerator control device, a separate pivotally mounted foot pedal engageable adjacent one end with the accelerator and capable of being depressed by a movement thereof about its pivot in one direction to actuate said accelerator, a rack bar fixed with respect to said foot pedal, a spring-pressed latch carried by the foot pedal and movable laterally with respect thereto from a normal position into engagement with said rack bar to prevent movement of said foot pedal in the accelerating direction, means engageable with said latch to prevent any other movement thereof than said lateral movement, and means forming a stop to limit the movement of said foot pedal in a direction opposite to the first-named movement thereof.

5. In an accelerator control device, a pivotally mounted foot pedal engageable adjacent one end with the accelerator and capable of being depressed by a movement thereof about its pivot in one direction to actuate said accelerator, a rack bar fixed with respect to said foot pedal, a latch slidable laterally with respect to said foot pedal and having a portion capable of being engaged by the foot of an operator to actuate said latch and also having a projection engageable with said rack bar when the latch is actuated in one direction, said latch further being provided with a longitudinally extending slot, means carried by the foot pedal and projecting into said slot for forming an abutment and to prevent any other than said lateral movement, and a spring introduced into said slot and engageable with the last-named means and said latch to yieldably maintain the latch in an inoperative position.

6. A device for controlling the accelerator of a motor vehicle, comprising in combination a pedal adapted to be movably mounted on a floor board of the vehicle in position to engage and actuate the accelerator, a stationary rack, a latch slidably mounted on said pedal in position to be projected by the foot of the operator into locking engagement with said rack, and continuously acting means tending to hold said latch in retracted position.

CHARLES B. WRIGHT.